(12) United States Patent
Francois et al.

(10) Patent No.: US 11,829,481 B2
(45) Date of Patent: Nov. 28, 2023

(54) METHOD OF VERIFYING THE INTEGRITY OF AN ELECTRONIC DEVICE, AND A CORRESPONDING ELECTRONIC DEVICE

(71) Applicant: IDEMIA FRANCE, Colombes (FR)

(72) Inventors: Axel Francois, Colombes (FR); Michele Sartori, Colombes (FR)

(73) Assignee: IDEMIA FRANCE, Colombes (FR)

(*) Notice: Subject to any disclaimer, the term of this patent is extended or adjusted under 35 U.S.C. 154(b) by 0 days.

(21) Appl. No.: 16/082,351

(22) PCT Filed: Mar. 7, 2017

(86) PCT No.: PCT/FR2017/050497
§ 371 (c)(1),
(2) Date: Sep. 5, 2018

(87) PCT Pub. No.: WO2017/153670
PCT Pub. Date: Sep. 14, 2017

(65) Prior Publication Data
US 2019/0042758 A1     Feb. 7, 2019

(30) Foreign Application Priority Data

Mar. 7, 2016    (FR) ........................................ 1651884

(51) Int. Cl.
*G06F 21/57*     (2013.01)
*G06F 21/44*     (2013.01)
(Continued)

(52) U.S. Cl.
CPC ............ *G06F 21/575* (2013.01); *G06F 21/44* (2013.01); *G06F 21/57* (2013.01); *G06F 21/73* (2013.01);
(Continued)

(58) Field of Classification Search
CPC .... G06F 21/44; G06F 2221/034; G06F 21/73; G06F 21/57–575; H04M 1/24
See application file for complete search history.

(56) References Cited

U.S. PATENT DOCUMENTS 8,925,069 B2 * 12/2014 Louboutin ............ H04W 12/06
                                                      713/168
11,269,984 B2 * 3/2022 Raskin ................ H04L 63/0442
(Continued)

FOREIGN PATENT DOCUMENTS

EP          1 469 369 A2    10/2004

OTHER PUBLICATIONS

International Search Report dated May 19, 2017, International Application No. PCT/FR2017/050497, 3 pages.

*Primary Examiner* — Daniel B Potratz
(74) *Attorney, Agent, or Firm* — MH2 TECHNOLOGY LAW GROUP, LLP (57) ABSTRACT

A method and devices for verifying the integrity of an electronic device having connected thereto at least one connectable or disconnectable component. The method can include obtaining (D52) information specific to at least one connectable or disconnectable component, the information being stored in the connectable or disconnectable component; preparing (E54) a temporary first master value on the basis of the information specific to the at least one connectable or disconnectable component; and authenticating (E54) the temporary first master value by using a previously-prepared second master value in order to determine the integrity of the electronic device.

21 Claims, 5 Drawing Sheets

(51) Int. Cl.
*G06F 21/73* (2013.01)
*H04M 1/24* (2006.01)
(52) U.S. Cl.
CPC ......... *H04M 1/24* (2013.01); *G06F 2221/034* (2013.01)

(56) References Cited

U.S. PATENT DOCUMENTS

| | | | |
|---|---|---|---|
| 2004/0177168 A1 | 9/2004 | Alabraba et al. | |
| 2006/0253554 A1 | 11/2006 | Uwais | |
| 2011/0314304 A1* | 12/2011 | Braams | G06F 21/79 713/193 |
| 2012/0066493 A1* | 3/2012 | Widergren | H04L 63/0428 713/160 |
| 2012/0166524 A1* | 6/2012 | Watakabe | G06F 12/1416 709/203 |
| 2013/0021949 A1* | 1/2013 | Kaal | H04W 48/16 370/255 |
| 2013/0207783 A1* | 8/2013 | Cruzado | G06K 19/073 340/10.5 |
| 2014/0122897 A1* | 5/2014 | Dodeja | G06F 21/57 713/189 |
| 2014/0253977 A1* | 9/2014 | King | G06V 20/66 358/473 |
| 2016/0085960 A1* | 3/2016 | Priev | H04L 9/0894 726/7 |
| 2016/0275461 A1* | 9/2016 | Sprague | H04W 12/06 |
| 2017/0323121 A1* | 11/2017 | Liu | G06F 21/78 |
| 2018/0191504 A1* | 7/2018 | An | H04L 29/06 |

* cited by examiner

METHOD OF VERIFYING THE INTEGRITY OF AN ELECTRONIC DEVICE, AND A CORRESPONDING ELECTRONIC DEVICE

CROSS-REFERENCE TO RELATED APPLICATIONS

This application is a U.S. National Stage application of International Application No. PCT/FR2017/050497 filed 7 Mar. 2017, which claims priority to French Application No. 1651884 filed 7 Mar. 2016, the entire disclosures of which are hereby incorporated by reference in their entireties.

BACKGROUND OF THE INVENTION

The invention relates to electronic devices to which components can be connected and disconnected, and it relates in particular to mobile electronic devices.

Electronic devices such as mobile telephones can be configured so that various components can be connected thereto or disconnected therefrom. Proposals have been made in particular for so-called "modular" telephones in which there may be numerous connectable or disconnectable components, such as: the camera, the loudspeaker, the memory, the biometric reader, etc. That makes it possible, without changing telephone, to obtain new functions, to replace faulty components, or indeed to improve the performance of the telephone.

Electronic devices such as mobile telephones are also being used more and more for performing actions that can require a high level of security. For example, mobile telephones may be used to make payments or indeed to authenticate a user.

By way of indication, it is entirely conceivable that a connectable or disconnectable component might be designed for fraudulent purposes, so that it constitutes a danger for the security of payments made using a modular telephone.

Thus, a component recovered after a theft or a loss of that component by its initial user might be used by some other user without that being desired by the initial user.

The use of connectable or disconnectable components thus makes the electronic devices to which they are connected less secure.

Furthermore, there do not exist any verification means that are satisfactory for limiting the use of certain components used in mobile electronic devices.

The object of the present invention is thus to solve the above-presented problems.

OBJECT AND SUMMARY OF THE INVENTION

The present invention satisfies this need by proving a method of verifying the integrity of an electronic device having connected thereto at least one connectable or disconnectable component, the method comprising:

obtaining information specific to said at least one connectable or disconnectable component, the information being stored in said connectable or disconnectable component;

preparing a temporary first master value on the basis of said information specific to said at least one connectable or disconnectable component; and authenticating said temporary first master value by using a previously-prepared second master value in order to determine the integrity of the electronic device.

In other words, it is verified that the information provided by the connectable or disconnectable component enables a temporary first master value to be prepared that, by way of example, should be identical to a previously-prepared second master value. By way of example, the two values may indeed be identical if they are encryption keys for symmetric key encryption, or else they may be different if the values are personalized by an asymmetric key mechanism having a pair of keys (public key, private key). Various situations are possible, but it is necessary for it to be possible to authenticate one value relative to the other value.

Replacing a connectable or disconnectable component leads to preparing a temporary first master value that cannot be authenticated when using the second master value.

The use of a master value makes it possible to perform authentication in which the master values are compared, however it also makes it possible to perform authentication that is more complex, in which a token is encrypted by means of each master value, with the results then being compared.

Thus, it may be observed that if a plurality of connectable or disconnectable components are connected to the electronic device, the temporary first master value is prepared on the basis of all of said information specific to each of the connectable or disconnectable components.

It may be observed that if integrity of the electronic device is not found (e.g. if the authentication fails), it is possible to place the electronic device in a degraded mode of operation in which, by way of example: a secure function is no longer available; the connectable or disconnectable component is blocked; or indeed the entire electronic device is blocked. In a degraded mode of operation, if the device is a mobile telephone, it is possible to make available only an emergency call function.

In a particular implementation, the method includes, prior to said preparing the temporary first master value, verifying an indicator of the electronic device that indicates whether the electronic device is locked for one user.

It may be observed that if the device is not locked for one user, then it is not possible to use a previously-obtained second master value, e.g. if that second master value is associated with the user.

In a particular implementation, said information specific to said at least one connectable or disconnectable component includes an identifier of the component.

In a particular implementation, said indicator of the electronic device that indicates whether the device is locked for one user is stored in a secure memory of the electronic device or in a memory of a secure element of the device or in a remote server.

In a particular implementation, the method further comprises obtaining information specific to the user of the electronic device as stored in said connectable or disconnectable component; and deducing the integrity of the electronic device from said authentication of said temporary first master value and from authentication of information specific to the user of the electronic device by using previously-obtained information specific to the user of the electronic device.

In this implementation, the device is associated with one user, and information about that user is stored in the connectable or disconnectable component.

This makes it possible to avoid a component associated with a second user being used in an electronic device that is already associated with a first user.

By way of example, this makes it possible to limit the use of components that have been stolen or lost, thereby limiting dishonest resale.

In a particular implementation, the information specific to the user of the electronic device and stored in the connectable or disconnectable component and the previously-obtained information specific to the user of the electronic device is prepared on the basis of biometric information of the user and/or on the basis of a personal code of the user of the electronic device.

It may be observed that by preparing the information specific to the user, it is possible to transform the personal data of the user so that it is not possible to discover a personal code or indeed biometric information. The preparation may involve using a hash function or indeed using an encryption function.

In a particular implementation, the information specific to the user is stored in a secure memory of the electronic device or in a memory of a secure element of the electronic device or in a remote server.

In a particular implementation, said previously-obtained information specific to the user is associated with said second master value.

In a particular implementation, the method includes verifying an indicator of the connectable or disconnectable component that indicates whether the component is associated with the electronic device.

The indicator of the component may be a numerical value, e.g. a hexadecimal value, or indeed a single bit.

In a particular implementation, the second master value is stored in a secure memory of the electronic device, or in a memory of a secure element of the device, or in a remote server, and if the second master value is stored in the remote server, said authentication of the temporary first master value is performed by at least one communication with said remote server.

It may be observed that if the master value is stored in a secure memory of the electronic device, the secure memory may be a memory that is accessible only from a trusted execution environment, e.g. a memory in which the stored data is stored.

The master value may also be stored in a secure element.

A first type of secure element is known as an embedded secure element (eSE) and is specified in the specification "Global Platform card specification version 2.2.1" relating to the Global Platform standard. That first type relates to secure elements that are embedded, i.e. that cannot be removed.

A second type of secure element is known as a universal integrated circuit card (UICC) and is specified in the standard "ETSI TS 102 221", and this term covers conventional removable integrated circuit (IC) cards of the subscriber identity module (SIM) card type (or universal SIM (USIM) type), or indeed secure tokens, each identifiable in unique manner.

If the master value is stored in a secure element in the form of an IC card, the data processor device includes a card reader connected to the mobile device and designed to receive the microcircuit card in order to enable data to be exchanged therewith.

It may be observed that by storing the master value in a secure element, a good level of security is obtained. A secure element may be thought of as being a safe containing keys, certificates, or data specific to a user.

It may be observed that if a trusted execution environment is active in the electronic device, that environment may be the only environment capable of communicating with the secure element. In the method as defined above and if a secure element is used, the trusted execution environment may perform functions, e.g. encryption, and the secure element may be used for storage.

Finally, it may be observed that the above remarks relating to storing the master value apply mutatis mutandis to storing information specific to the user, or indeed to storing the indicator of the device that indicates whether or not the device is locked for one user.

In a particular implementation, the integrity of the device is verified prior to performing at least one secure function of the electronic device.

By way of indication, the integrity of the device may be verified prior to executing a payment application that requires the use of secure functions of the electronic device.

In a particular implementation, the method is performed at least in part by means of a trusted execution environment.

A trusted execution environment (TEE) is a secure mode of operation of an electronic device, which may be implemented by the main processor of the electronic device in a manner that is distinct from implementing the non-secure operating system of the device, i.e. the rich operating system (Rich-OS) of the device. This trusted execution environment may execute secure functions or may store secret and secure data such as keys or certificates. The Global Platform standard "TEE system architecture V1.0|GPD SPE 009" describes such trusted execution environments. By way of indication, a trusted execution environment may at least perform cryptographic functions as defined in the Global Platform standard.

In a particular implementation, the method the device is provided with a rich operating system and the method includes an initial step of switching from the rich operating system to the trusted execution environment.

In a particular implementation, the method comprises the following prior steps:

connecting said connectable or disconnectable component to the electronic device;

obtaining said information specific to said at least one connectable or disconnectable component stored in said connectable or disconnectable component; and preparing said second master value on the basis of said information specific to said at least one connectable or disconnectable component.

This particular implementation thus includes connecting the connectable or disconnectable component.

In a particular implementation in which it is verified whether said indicator of the electronic device that indicates whether or not the device is locked for one user while verifying integrity, it is verified that the indicator of the electronic device that indicates whether the device is locked for one user indicates that the device is not locked for one user prior to preparing said second master value.

This implementation makes it possible to authorize connection of a new component only under selected circumstances, e.g. on first connection of a component to the electronic device. Thus, this implementation seeks to create the second master value, and the steps involved in this implementation are thus performed prior to authenticating a temporary master value.

In an implementation in which, while verifying integrity, verification is performed of an indicator of the connectable or disconnectable component indicating whether or not the component is associated with the electronic device, if the indicator of the electronic device that indicates whether the device is locked for one user indicates that the device is not locked for one user, said indicator of the connectable or disconnectable component is given a state that indicates that the component is associated with the electronic device after preparing said master value.

In a particular implementation in which, while verifying integrity, information specific to the user of the device is obtained, the method includes prior preparation of said information specific to the user in which the user interacts with the electronic device, and storing said information specific to the user in at least said connectable or disconnectable component.

In a particular implementation, said connectable or disconnectable component is disconnected (e.g. after verifying integrity).

In a particular implementation in which said indicator of the component is used, prior to said disconnection, said indicator of the connectable or disconnectable component is given a state that indicates that the component is not associated with the electronic device.

Thus, in an electronic device of integrity that has been confirmed, it is possible to enable the component to be connected in another electronic device by modifying the state of the indicator of the component.

In a particular implementation in which, while verifying integrity, verification is performed of an indicator of the connectable or disconnectable component that indicates whether the component is associated with the electronic device, in order to allocate to said indicator of the connectable or disconnectable component a state that indicates that the component is not associated with the electronic device, the method includes:

preparing said information specific to the user in which the user interacts with the electronic device, and comparing said information specific with the user as prepared with the information as previously obtained.

Thus, only the genuine user of the electronic device can release a component.

In a particular implementation, an error is detected and the electronic device is blocked, or the electronic device is caused to operate in a degraded mode of operation, or said at least one connectable or disconnectable component is blocked.

In a particular implementation, the master value is a value of a type selected from the group comprising: a key; a token; the result of a hash function; and the result of a cryptographic function.

The invention also provides an electronic device to which at least one connectable or disconnectable component can be connected, the device comprising:

a module for obtaining information specific to said at least one connectable or disconnectable component and stored in said connectable or disconnectable component;

a module for preparing a temporary first master value on the basis of said information specific to said at least one connectable or disconnectable component; and a module for authenticating said temporary first master value by using a previously-prepared second master value in order to determine the integrity of the electronic device.

The electronic device may be configured to implement each of the implementations of the method as defined above.

In a particular embodiment, the electronic device is a mobile electronic device.

The mobile electronic device may be a mobile telephone, a connected object (e.g. a connected watch), a motor vehicle (e.g. a drone).

BRIEF DESCRIPTION OF THE DRAWINGS

Other characteristics and advantages of the present invention appear from the following description made with reference to the accompanying drawings, which show an example having no limiting character.

In the figures.

DETAILED DESCRIPTION OF AN IMPLEMENTATION

Figure 1:
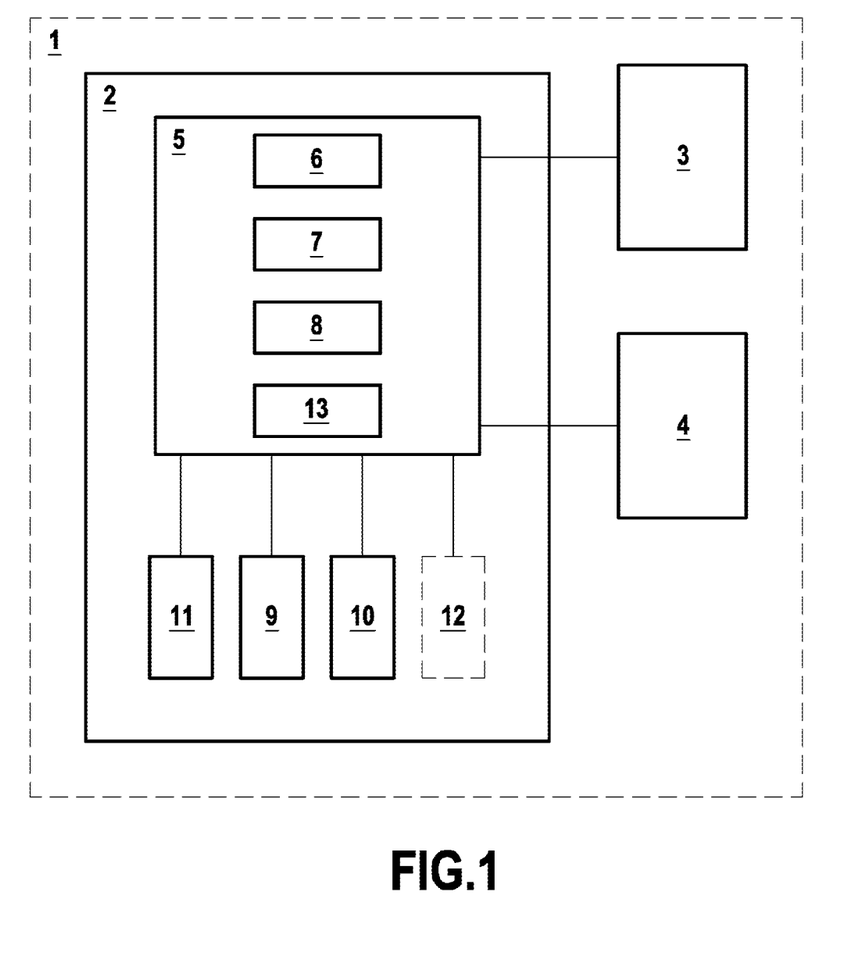
FIG. 1 is a diagram showing an electronic device in an embodiment of the invention.

FIG. 1 is a diagram of a modular mobile telephone 1. Nevertheless, the invention is not limited to modular mobile telephones, and the description below can be applied to other types of electronic device in which it is possible to connect or disconnect components, and in particular mobile devices (e.g. a connected object, a motor vehicle, etc.).

In this example, the telephone 1 has a motherboard 2 on which components can be mounted in permanent manner or otherwise.

In the example shown, components 3 and 4 are connected to the remainder of the device by a connection to the motherboard 2. By way of example, the components 3 and 4 may be selected from a camera, a loudspeaker, a random access memory (RAM), a non-volatile memory (e.g. a read only memory (ROM) or a flash memory), a biometric reader, a central processor unit (CPU), a graphics processor unit (GPU), a screen (e.g. a liquid crystal display (LCD) or an organic light-emitting diode (OLED) or a light-emitting diode (LED) display, or indeed an electronic display), a man-machine interface (e.g. buttons, a touch pad, etc.) etc.

The motherboard 2 is provided with a trusted execution environment (TEE) 5, and it should be observed that this is shown in simplified manner without the various hardware and software aspects of a trusted execution environment being shown in distinct manner. The motherboard 2 is also provided with a rich operating system (Rich-OS) 11, the electronic device being capable of switching from the rich operating system to the trusted execution environment in order to perform secure functions.

The switchover from the rich operating system to the trusted execution environment (or vice versa) is performed by a software element referred to in the art as a "secure monitor" that makes it possible to pass from one mode to the other.

By way of example, the rich operating system may request the launching of a secure application that is executed by the trusted execution environment. The rich operating system then sends a request to the secure monitor with the identifier of the secure application that is to be executed by the trusted execution environment. If the identifier is valid, the secure monitor launches switchover to the trusted execution environment, and the application is executed. At the end of executing the secure application, it is possible to switch to the mode of execution that corresponds to the rich operating system.

In this example, the trusted execution environment 5 comprises:

a module 6 for obtaining information specific to each component 3 or 4 that is connectable to or disconnectable from the electronic device, which information is stored in each connectable or disconnectable component 3 or 4;

a module 7 for preparing a temporary first master value on the basis of said information specific to the connectable or disconnectable components;

an authentication module 8 for authenticating said temporary first master value by using a second master value prepared beforehand in order to deduce therefrom the integrity of the mobile telephone 1; and a module 13 capable of executing security functions (e.g. cryptographic functions), this module corresponding by way of example to the core of the trusted execution environment.

Other components are shown in FIG. 1, in particular a secure element 9 of the universal integrated circuit card (UICC) or of the embedded universal integrated circuit card (eUICC) type. The secure element 9 of the eUICC type is mounted on the motherboard 2 and it communicates with the trusted execution environment 5, making it possible in particular to authenticate the mobile telephone 1 on a mobile communication network. It should be observed that communication between the eUICC type secure element 9 or the eSE type secure element 12 and the trusted execution environment 5 takes places by means of a secure channel of the SCP11 type as described in the Global Platform standard.

Optionally, the motherboard 2 may be provided with an additional secure element 12 of the eSE type. This additional secure element 12 may be used for storing:

the second master value;
information specific to the user; and/or
the indicator of the electronic device.

The additional secure element 12 of eSE type may be used for performing cryptographic operations, such as authentication or identification operations that are analogous to the operations that can be performed by the module 13. For example, the additional secure element 12 may be used for authenticating the master values.

Alternatively, and in the absence of the secure element, the second master value, the information specific to the user, and the indicator of the electronic device may be stored in particular in a secure memory of the trusted execution environment (in which information is encrypted), or indeed in a memory of the secure element 9. In another possible implementation, this information may be stored in a remote server.

The server may also perform cryptographic operations, such as for example authenticating master values. It may be observed that communication between the remote server and the device may optionally be secure, e.g. encrypted, so as to obtain a good level of security for the information that is communicated.

In order to make such storage in a remote server possible, the mobile telephone 1 is also provided with communication means 10, e.g. an antenna.

Below, there follows a description of steps in a method of the invention performed by an electronic device such as the mobile telephone described with reference to FIG. 1. In FIGS. 2A to 4, the electronic device has only one secure element of the eUICC type, which element is also used for storing information.

Figure 2A:
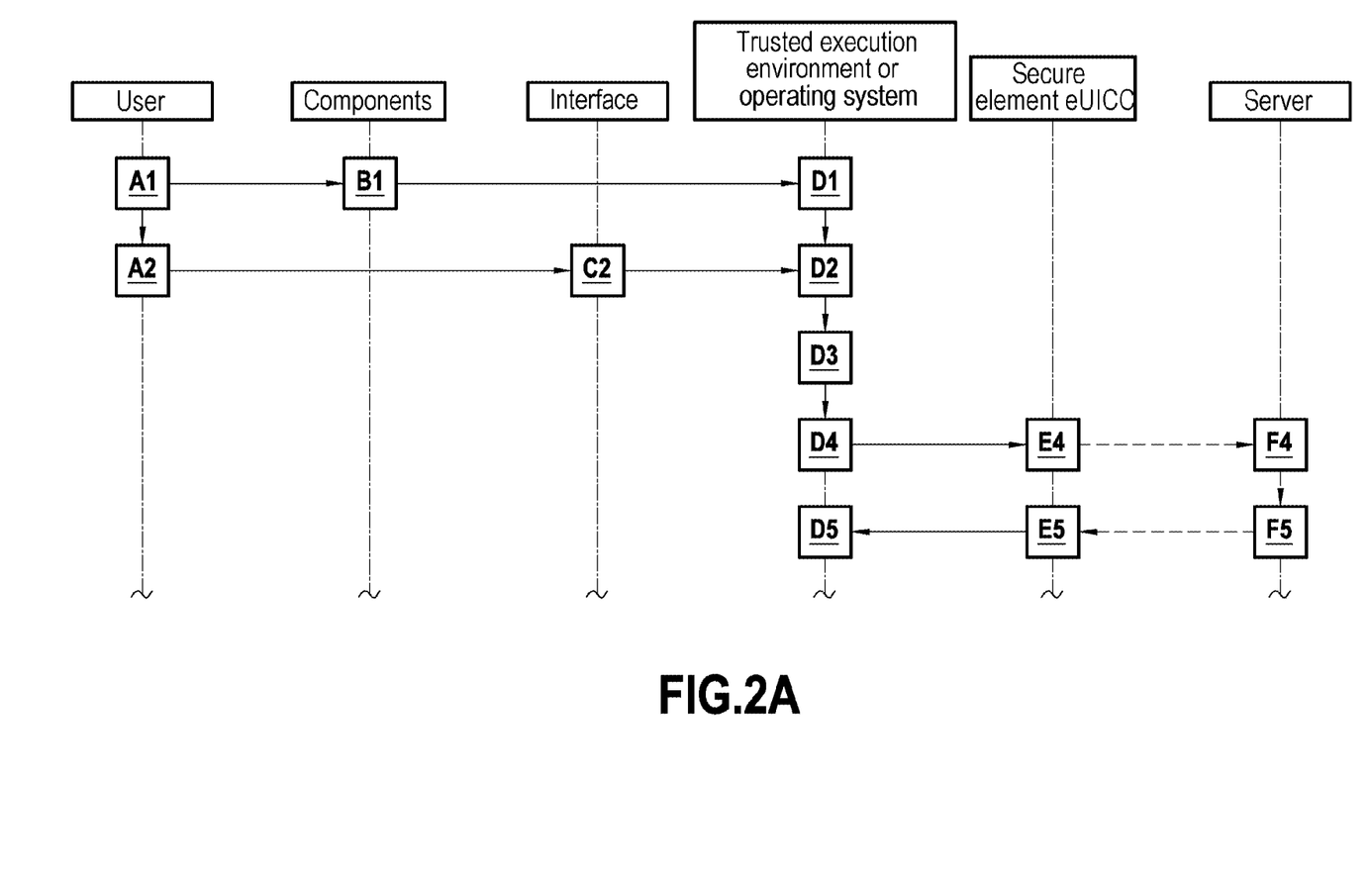
FIGS. 2A and 2B show various prior steps performed during connection of a component to an electronic device.
Figure 2B:
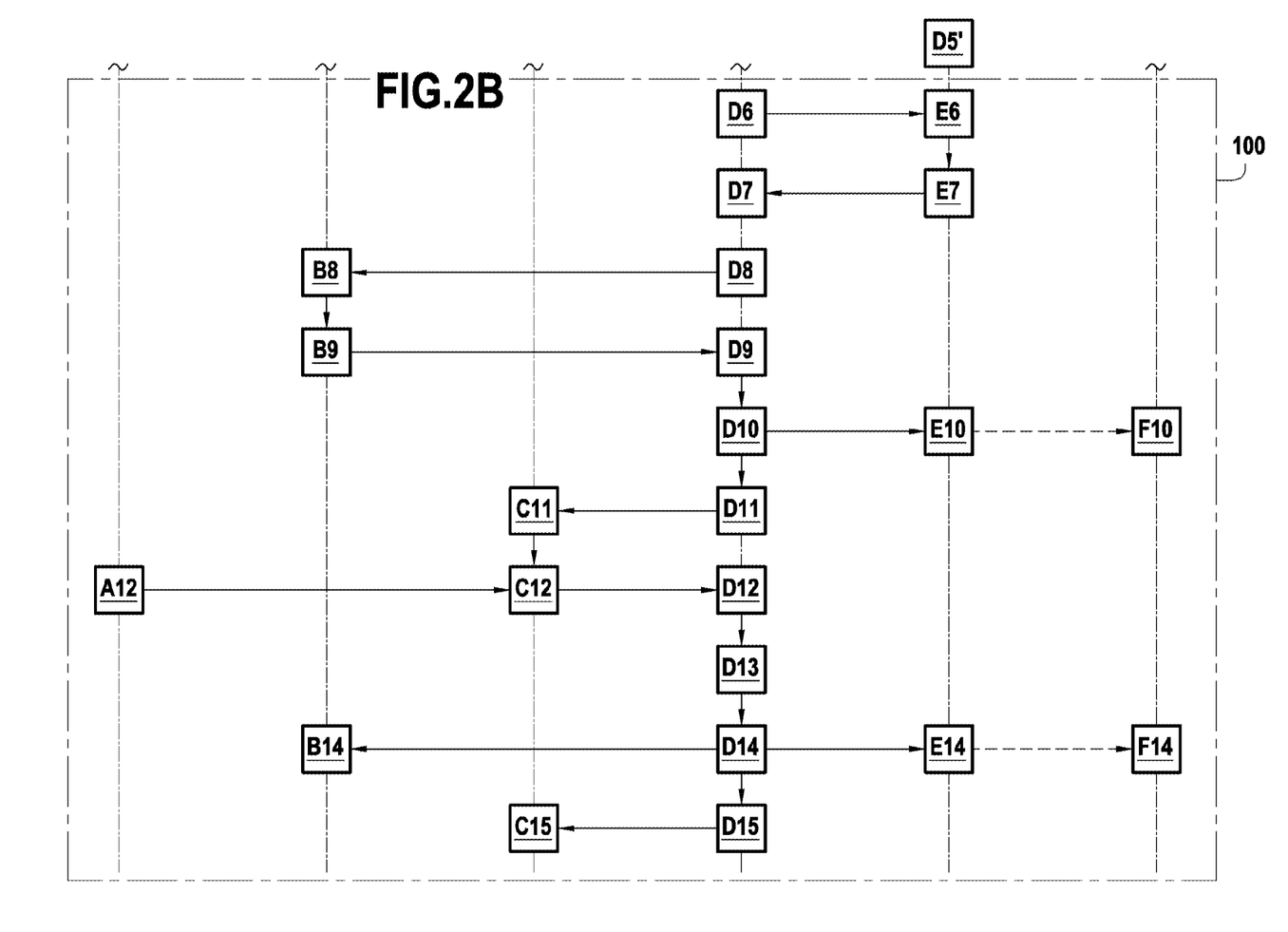

FIGS. 2A and 2B show various steps performed prior to verifying the integrity of an electronic device (e.g. the mobile telephone of FIG. 1). These steps are performed on connecting a new component.

The example of FIGS. 2A and 2B relates most particularly to configuring a new electronic device assembled with components for the first time.

In a first step A1, the user selects one or more components (step B1) and these components are connected to the remainder of the electronic device. These components are received by the electronic device in step D1.

Thereafter, the user switches on the electronic device in step A2 by acting on a man-machine interface in step C2. The Rich-OS type operating system is then activated (step D2).

In step D3, the operating system verifies that all of the components necessary for normal operation of the system are connected thereto.

Thereafter, the electronic device (specifically a mobile telephone) verifies that a secure element is present making it possible to connect to the mobile communication network (in other words it verifies that an eUICC element is present), and it then seeks to authenticate itself with the mobile communication network via the secure element (step E4) and a remote server (step F4), the remote server possibly being a mobile network operator (MNO). Authentication on a mobile network is performed in secure manner (e.g. by sharing keys).

In step D5, the operating system receives confirmation from the secure element (sent in step E5) that a minimum connection is active with the mobile network operator (e.g. to make it possible to send emergency calls, or to perform certain steps of verifying the integrity of the electronic device).

It may be observed that steps D4 to D5 correspond to conventional authentication of an electronic device fitted with an eUICC type secure element.

Subsequently, step D5' is performed. In this step, the rich operating system requests execution of functions or of an application of the trusted execution environment to be performed prior to verifying the integrity of an electronic device.

Following this request from the rich operating system (e.g. made to a secure monitor), the electronic device switches into a mode in which the trusted execution environment is active and capable of executing applications or functions. This is represented by chain-dotted box 100. When the trusted execution environment is active, there is a good level of security and of confidentiality that makes it possible to use secure functions.

Below, for reasons of simplicity and by abuse of language, it should be observed that a distinction is not always made between the trusted execution environment and an application or functions that are executed by the trusted execution environment.

In step D6, the trusted execution environment verifies that the electronic device is indeed being used for the first time, and this is done by issuing a request to the secure element so that the secure element acts in step E6 to verify:

that an indicator of the electronic device stored in the secure element indicates that the device is not locked for one user (if it is a flag, the flag may be set at "false"; the indicator may equally well be a security bit or a digital value such as a hexadecimal value);

that the personal identification number (PIN) is indeed 0000, which corresponds to the code stored in appliances before their first use; and that the value of a master value indicates that the master value has not yet been prepared (for example whether it has a predetermined value such as 00FA in hexadecimal).

It may be observed at this point, that it is in the eUICC type secure element that these verifications are performed, however this could equally well be done:

in an eSE type secure element if the electronic device has such a secure element; or in the trusted execution environment 5 (e.g. by means of its modules 6 to 13), with the information that is used for performing the verifications then being stored in a secure memory accessible solely by the trusted execution environment.

Certain verification operations in step E06 are optional and the person skilled in the art knows how to select which tests are to be performed.

In step E7, the secure element communicates the result of its verifications to the trusted execution environment, which receives them in step D7.

The trusted execution environment can then prepare a second master value. This second master value is stored in this example in the eUICC type secure element, however it is equally possible for it to be stored in an eSE type secure element if the electronic device has such a secure element, or indeed, in the absence of a secure element, it may be stored in a secure memory of the trusted execution environment (in which information is encrypted). For this purpose, the trusted execution environment makes a request (step D8) to the components for the information that is specific to them. This request is received by the components in step B8.

By way of indication, the information specific to each component may comprise: a media access control (MAC) address; a universally unique identifier (UUID); an international mobile equipment identity (IMEI); the result of a physical unclonable function (PUF); or indeed any other information suitable for identifying the component in unique manner.

In step B9, the components send the information that is specific to them to the trusted execution environment.

In step D10, the trusted execution environment sends the information that is specific to the components to the secure element, which then prepares and stores (step E10) a second master value on the basis of that information specific to the components by making use of a cryptographic algorithm. Alternatively, a trusted execution environment module may prepare the second master value, which is then either stored in a secure memory of the trusted execution environment, or is stored in the eUICC type secure element, or else is stored in an eSE type secure element, if such a secure element is present.

In another alternative, the second master value is neither prepared by the secure element nor stored in the secure element, and step E10 involves sending to a remote server that prepares and stores the second master value (step F10). The server could equally well do no more than prepare the second master value and then return it to the electronic device for storage.

Thereafter, the trusted execution environment informs the user, by means of the man-machine interface, that information such as a personal code or nominal identification information or biometric information is needed (steps D11 and C11). The man-machine interface may comprise a screen on which a message is displayed in order to request the user to input a personal code (e.g. a new PIN), or biometric information.

In step A12, the user interacts with the interface and inputs information such as a PIN or biometric information received by the man-machine interface in step C12. It may be observed that a PIN or biometric information comprise data that is personal and specific to the user.

This information is then transmitted to the trusted execution environment, which receives it (step D12).

In step D13, the trusted execution environment prepares information specific to the user of the device, e.g. by means of a hash or encryption function. This preparation may likewise be performed by means of a hash or encryption function forming part of the secure element of the server.

In step D14:
the trusted execution environment requests that the indicator of the electronic device as stored in the secure element indicate that the device is locked for one user (step E14);
the information specific to the user is sent to the secure element which stores it (likewise in step E14) in association with the second master value if it is stored in the secure element, or else the secure element sends that information to the server which stores it (step F14) in association with the second master value if it is stored in the server; and
the trusted execution environment sends the information specific to the user to each component, and changes the state of an indicator in each component in order to indicate that the component is associated with this particular electronic device (step B14).

Thereafter, the trusted execution environment may act in step D15 to inform the user via the man-machine interface that the new electronic device has been correctly configured. By way of example, the man-machine interface may display a message on these lines (step C15).

After step C15, the electronic device operates in a manner analogous to a conventional mobile telephone. For example, the user may be requested to input the PIN in order to authenticate the user with the mobile network operator.

Figure 3:
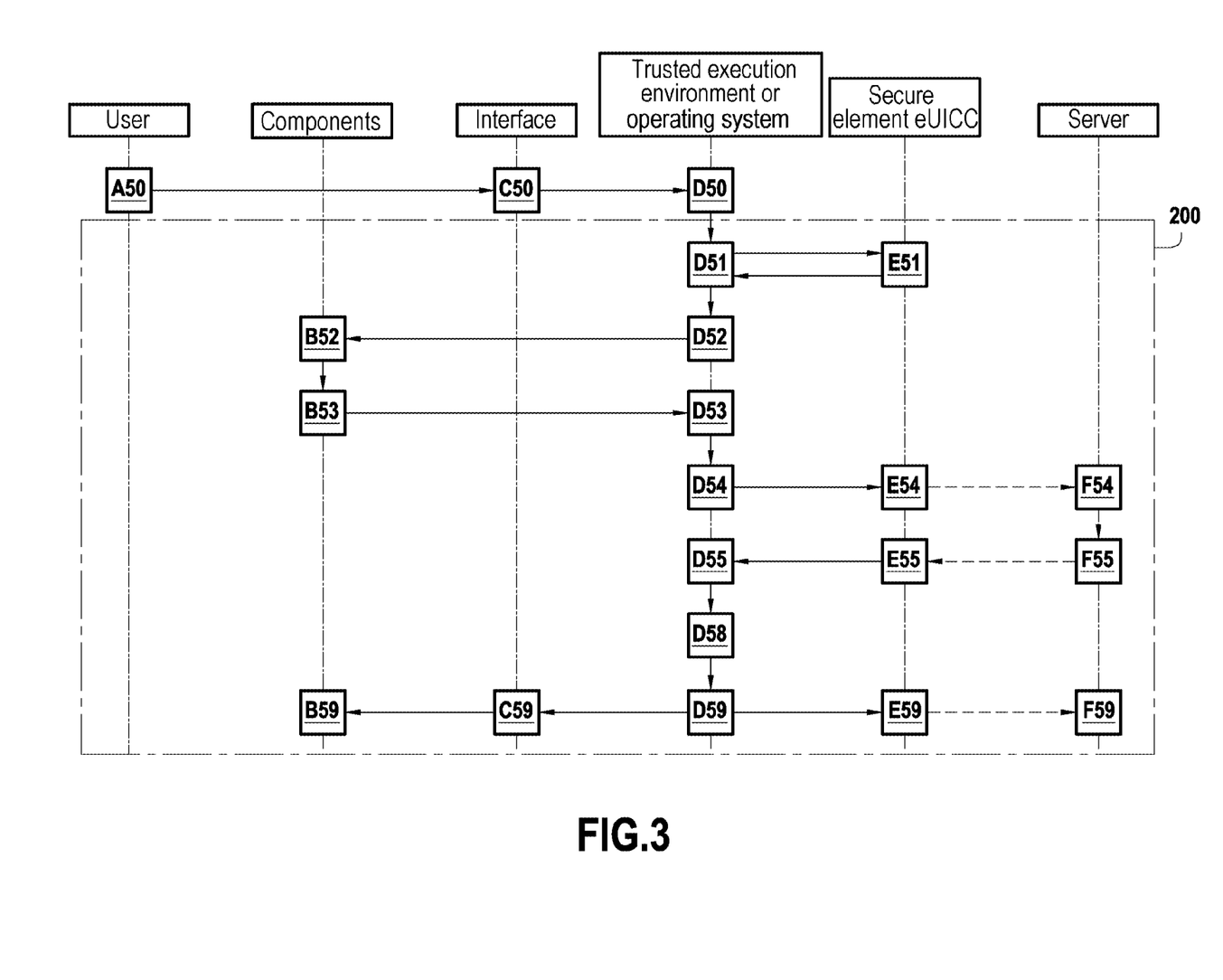
FIG. 3 shows various steps of a method of verifying the integrity of an electronic device.

FIG. 3 corresponds to verifying the integrity of an electronic device that has already been configured by the steps of the method described with reference to FIGS. 2A and 2B.

In a first step A50, the user uses the man-machine interface to request the performance of a secure function by the electronic device. This secure function may be a function associated with payment.

In step C50, the man-machine interface relays the request from the user to the rich operating system, which receives it and performs step D50. In step D50, the rich operating system requests the execution of functions of the trusted execution environment (which correspond to the secure function requested by the user). This causes a switchover to the mode in which the trusted execution environment is active (chain-dotted box 200) and this also causes the integrity of the electronic device to be verified.

In steps D51 and E51, the trusted execution environment verifies that the indicator of the electronic device as stored in the secure element indicates that the device is locked for one user (this state being given in step E14 as described with reference to FIGS. 2A and 2B).

It should be observed that it is possible, at this stage, to verify a signature of the application corresponding to the method of verifying the integrity of the device as performed by the trusted execution environment. This signature verification is performed for applications that execute by means of a trusted execution environment in order to verify their integrity.

Thereafter, in step D52, the trusted execution environment may request the components connected to the electronic device to provide information that is specific to them together with information that is specific to the user of the electronic device (as stored during step B14 described with reference to FIGS. 2A and 2B). Thus, in step D52, it is possible to request the components to provide the states of the indicators of the components that indicate whether they are associated with the electronic device. This request is received in step B52. In step B53, the components send this information to the trusted execution environment, which receives it in step D53.

Furthermore, the trusted execution environment transmits this information (step D54) to the secure element in order to prepare (step E54) a temporary first master value on the basis of the information specific to the components and in order to authenticate this temporary first master value by using the second master value that has been stored in the secure element or in the server (step F54). Thus, in these steps E54 and F54, the information specific to the user of the electronic device is authenticated by comparing information received from the modules with information stored previously.

The temporary first master value may be authenticated by comparing the two values, or indeed by using the two values (which may be keys) for signing the data and then comparing. Authentication may also be performed by means of the server if the server stores the second master value.

In step E55 (or F55 if the server is used), the result of the authentication is sent to the trusted execution environment, which receives it in step D55.

It may be observed that the authentication may also be performed by the trusted execution environment.

Thereafter, in step D58, the secure function requested by the user in step A50 is performed, once the integrity of the electronic device has been verified. This may be accompanied by displaying information on the interface in order to inform the user that integrity has been verified successfully. This may also be accompanying by activating one or more modules, preferably components used by the application. By way of indication, for a contactless payment application making use of near-field communication (NFC), a connectable or disconnectable NFC component may be unblocked or activated.

The following steps illustrate the situation in which the integrity of the electronic device is not verified successfully because an error has been detected. By way of indication, the error may be the result of replacing one or more connectable or disconnectable components with one or more other components. Specifically, in the event of replacement, the information specific to the new component is different and the information specific to the user stored in the component is different, and as a result the value of the temporary first master value will be different from the expected value. Authentication is then not possible.

In step D59, the trusted execution environment indicates via the man-machine interface (step C59) that the verification of integrity has failed, and that the indicator of the component (if it is possible to identify it, e.g. if it is unique) has changed so as to specify which component is not associated with the electronic device. Thus, in step E59 (or F59 if a server is used), a state is given to the indicator of the device that indicates that the device is not locked for one user. This indicator may be sent to the remote server together with the list of components connected to the device, e.g. in order to verify whether these components appear in a black list of components that are not to be reused.

Other actions may be performed if an error is detected. In particular, it is possible to block the electronic device completely, or to enable only partial use thereof. It is also possible in step B59 to block the use of one or more connectable or disconnectable components (specifically, information may be written into components for blocking in order to indicate the blocked state, and this information may be sent to the remote server so that the components are added to a component black list).

Figure 4:
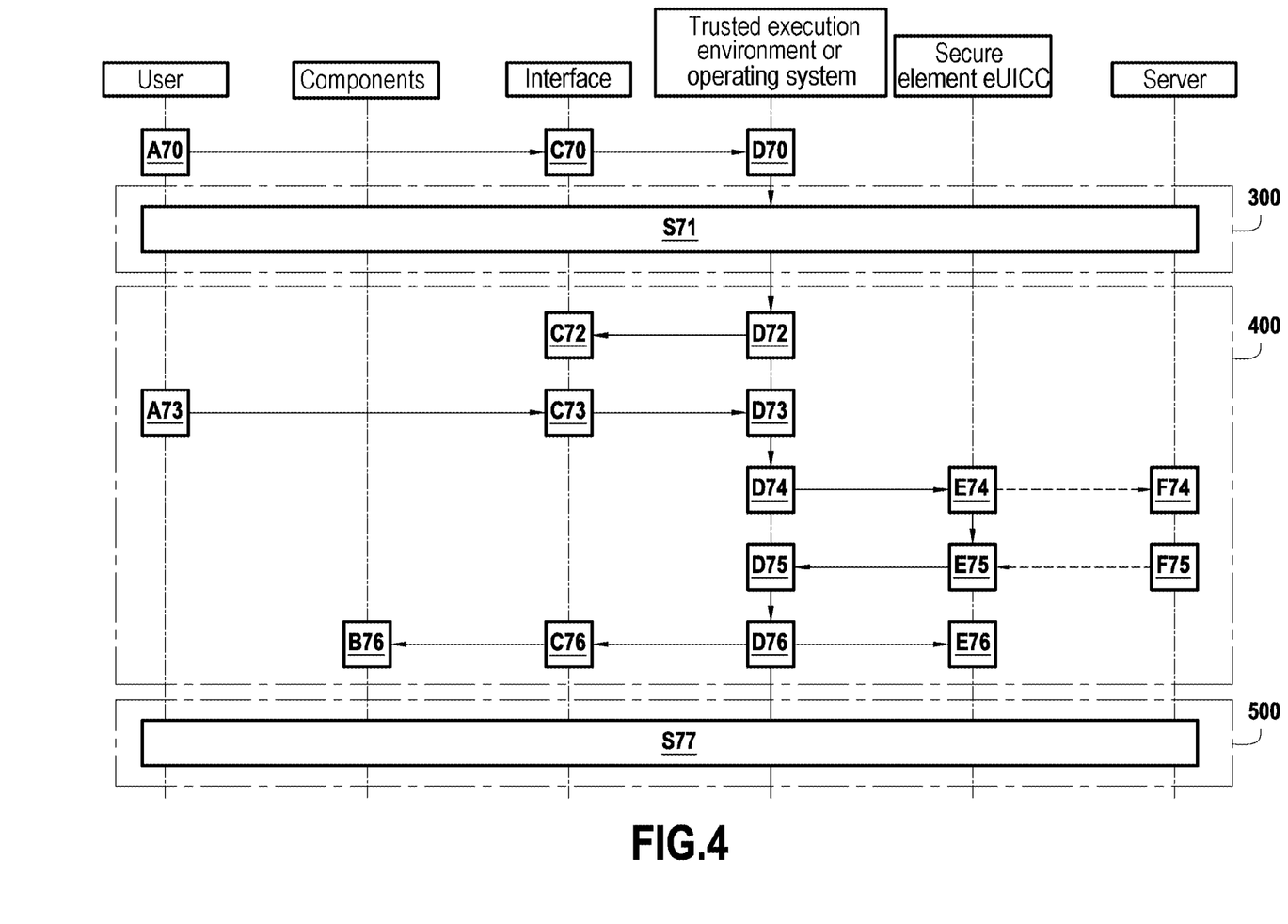
FIG. 4 shows various steps of a method in which a component is disconnected.

In FIG. 4, there are shown the various steps of replacing a connectable or disconnectable component.

In a first step A70, the user makes use of the man-machine interface (step C70) to indicate that the user seeks to replace a connectable or disconnectable component. This is notified to the rich operating system, which requests a switchover to the trusted execution environment by means of a request to the secure monitor (chain-dotted box 300). Alternatively, this request for replacing a component may come from a server (e.g. from the mobile network operator) in order to carry on from blocking as a result of an error concerning a component or an electronic device.

Step S71 is then performed, and this step comprises verifying the integrity of the electronic device as described with reference to FIG. 3, when the trusted execution environment is active.

By means of an active trusted execution environment (chain-dotted box 400), a step D72 is performed in which the interface is used to indicate that integrity has been verified and that the user is invited to input a personal code or biometric information (step C72).

In step A73, the user interacts with the man-machine interface (C73) in order to input a personal code or biometric information. This information is sent to the trusted execution environment which receives it (step D73).

In step D74, the trusted execution environment prepares information specific to the user on the basis of information received by the man-machine interface, the trusted execution environment requests the secure element to authenticate the received information, and the secure element performs this authentication with the information specific to the user as already stored in the secure element (step E74). In step E75, the secure element sends the result of authentication to the trusted execution environment which receives it in step D75. It may be observed that it is possible to prepare or store information specific to the user within the trusted execution environment, within a secure element, or within a server (optional steps F74 and F75). It may also be observed that communication between the trusted execution environment, the secure element, and the server may be performed using the secure protocol known in the Global Platform standard SCP80 or SCP81, using data that has been encrypted using the SCP02 or SCP03 protocol.

In step D76, the trusted execution environment:
informs the man-machine interface that the component(s) can be disconnected (step C76), and gives the indicator(s) of this or these components a state that indicates that they are not associated with an electronic device (step B76). The trusted execution environment also requests a change of the state of the indicator of the electronic device as stored in the secure element in order to indicate that the device is not locked for one user (step E76; this step possibly also being performed using the server); or
alternatively, if authentication of the information specific to the user fails, the trusted execution environment informs the man-machine interface (step C76) and leaves (step B76) in this or these component(s) the indicator(s) indicating that the component(s) is/are associated with the electronic device, thereby making it/them unusable in any other electronic device. The trusted execution environment also maintains the indicator indicating that the device is locked for one user (step E76; this step likewise possibly being performed by means of the server).

Thereafter, a step S77 is performed in which the user manipulates the components, removes them and replaces them, and performs steps analogous to those described with reference to FIGS. 2A and 2B in which an electronic device is configured for the first time. These steps are then performed while the trusted execution environment is active (chain-dotted box 500). It should be observed that there is a difference compared with the steps of FIGS. 2A and 2B: there is no longer any need to verify that the PIN is 0000 (first use of the electronic device).

Thus, certain components can be removed while the device remains switched on. This applies to less essential components. For more essential components, such as a processor (CPU), it is possible to perform a restart.

It should be observed that in the examples described above, the secure element need not be involved, since the trusted execution environment is capable, in certain implementations, of performing both the operations of preparing master values and the authentication operations.

In the same manner, the use of the server is optional, but that makes it possible to obtain an improved level of security and remote management of electronic devices. As can be understood, the use of indicators that are stored remotely makes it possible to limit the functions of the electronic device remotely.

Furthermore, the use of information specific to the user is optional, although it makes it possible to obtain a good level of security when verifying the integrity of an electronic device.

Finally, it may be observed that detecting an error at any time in the above-mentioned method may result in replacing one or more connectable or disconnectable components with one or more other components. Specifically, when performing a replacement, the information specific to the new component is different, the information specific to a user stored in the component is different, and as a result the temporary first master value will differ from the expected value. Authentication is then not possible.

Actions may be performed if an error has been detected. In particular, it is possible to block the electronic device completely, or to allow partial use thereof (degraded operation). It is also possible to block the use of one or more connectable or disconnectable components. A list of components that are not authorized for use in electronic devices can then be prepared so as to make a "black list". Such a black list stores the information and the identification of the components, possibly together with the unique identifiers of the devices associated with those components (the server can thus be used for the purpose of tracing components).

The invention claimed is:

1. A method of verifying integrity of an electronic device having connected thereto at least one connectable or disconnectable component, the method comprising:
   obtaining information specific to each of said at least one connectable or disconnectable component, the information being stored in each of said at least one connectable or disconnectable component respectively;
   preparing by a hashing function or a cryptographic function using as input said information specific to each of a respective connectable or disconnectable component of the at least one connectable or disconnectable component, and outputting as a result a temporary master value;
   authenticating said temporary master value using a second master value that has been previously prepared in order to determine the integrity of the electronic device, the second master value being a previous result of said hashing function or said cryptographic function;
   obtaining information specific to a user of the electronic device as stored in said connectable or disconnectable component; and
   deducing the integrity of the electronic device from said authentication of said temporary master value and from authentication of the information specific to the user of the electronic device by using previously-obtained information specific to the user of the electronic device.

2. The method according to claim 1, wherein said information specific to each of said at least one connectable or disconnectable component includes an identifier of the respective connectable or disconnectable component.

3. The method according to claim 1, wherein the information specific to the user of the electronic device and stored in the connectable or disconnectable component and the previously-obtained information specific to the user of the electronic device are prepared based on biometric information of the user or based on a personal code of the user of the electronic device.

4. The method according to claim 1, wherein said previously-obtained information specific to the user is associated with said second master value.

5. The method according to claim 1, including verifying a state of a second indicator for the at least one connectable or disconnectable component that indicates whether the at least one connectable or disconnectable component is associated with the electronic device.

6. The method according to claim 5, wherein said at least one connectable or disconnectable component is disconnected after the verifying; and
   wherein prior to said disconnection, the state of said second indicator is set to indicate that the connectable or disconnectable component is not associated with the electronic device.

7. The method according to claim 1, wherein the second master value is stored in a secure memory of the electronic device, or in a memory of a secure element of the electronic device, or in a remote server, and if the second master value is stored in the remote server, said authenticating of the temporary master value is performed by at least one communication with said remote server.

8. The method according to claim 1, wherein the integrity of the electronic device is verified prior to performing at least one secure function of the electronic device.

9. The method according to claim 1, wherein the method is performed at least in part using a trusted execution environment.

10. The method according to claim 9, wherein the electronic device is provided with a rich operating system and the method includes initially switching from the rich operating system to the trusted execution environment.

11. The method according to claim 1, wherein preparing of the second master value comprises:
    connecting said connectable or disconnectable component to the electronic device;
    obtaining said information specific to said at least one connectable or disconnectable component stored in said connectable or disconnectable component; and
    preparing said second master value based on said information specific to said at least one connectable or disconnectable component.

12. The method according to claim 1, wherein preparing of the second master value comprises:
    connecting said connectable or disconnectable component to the electronic device;

obtaining said information specific to said at least one connectable or disconnectable component stored in said connectable or disconnectable component;

preparing said second master value based on said information specific to said at least one connectable or disconnectable component; and preparing said information specific to the user, wherein the information specific to the user is obtained from user interaction with the electronic device, and storing said information specific to the user in said at least one connectable or disconnectable component.

13. The method according to claim 1, wherein said at least one connectable or disconnectable component is disconnected after the verifying.

14. The method according to claim 1, wherein said at least one connectable or disconnectable component is disconnected after the verifying;

wherein prior to said disconnection, a state of a second indicator is set to indicate that the connectable or disconnectable component is not associated with the electronic device; and wherein in order to set the state of said second indicator to indicate that the connectable or disconnectable component is not associated with the electronic device, the method includes:

preparing said information specific to the user in which the user interacts with the electronic device, and comparing said information specific to the user as prepared with the information as stored in said connectable or disconnectable component.

15. The method according to claim 1, wherein when an error is detected, the electronic device is blocked, or the electronic device is caused to operate in a degraded mode of operation, or said at least one connectable or disconnectable component is blocked.

16. The method according to claim 1, comprising, when the integrity of the electronic device is verified, unblocking or activating a near-field communication component of the electronic device.

17. A method of verifying integrity of an electronic device having connected thereto at least one connectable or disconnectable component, the method comprising:

obtaining information specific to each of said at least one connectable or disconnectable component, the information being stored in each of said at least one connectable or disconnectable component respectively;

preparing by a hashing function or a cryptographic function using as input said information specific to each of a respective connectable or disconnectable component of the at least one connectable or disconnectable component, and outputting as a result a temporary master value;

authenticating said temporary master value using a second master value that has been previously prepared in order to determine the integrity of the electronic device, the second master value being a previous result of said hashing function or said cryptographic function;

obtaining information specific to a user of the electronic device; and deducing the integrity of the electronic device from said authentication of said temporary master value and from authentication of the information specific to the user of the electronic device by using previously-obtained information specific to the user of the electronic device, wherein the information specific to the user of the electronic device and the previously-obtained information specific to the user of the electronic device are prepared based on biometric information of the user or based on a personal code of the user of the electronic device, and wherein the information specific to the user is stored in a secure memory of the electronic device or in a memory of a secure element of the electronic device or in a remote server.

18. A method of verifying integrity of an electronic device having connected thereto at least one connectable or disconnectable component, the method comprising:

obtaining information specific to each of said at least one connectable or disconnectable component, the information being stored in each of said at least one connectable or disconnectable component respectively;

preparing by a hashing function or a cryptographic function using as input said information specific to each of a respective connectable or disconnectable component of the at least one connectable or disconnectable component, and outputting as a result a temporary master value;

authenticating said temporary master value using a second master value that has been previously prepared in order to determine the integrity of the electronic device, the second master value being a previous result of said hashing function or said cryptographic function;

wherein preparing of the second master value comprises:

connecting said connectable or disconnectable component to the electronic device;

obtaining said information specific to said at least one connectable or disconnectable component stored in said connectable or disconnectable component; and preparing said second master value based on said information specific to said at least one connectable or disconnectable component;

wherein it is verified that a state of an indicator of the electronic device indicates that the electronic device is not locked for only one user prior to preparing said second master value.

19. The method according to claim 18, including verifying a state of a second indicator for the at least one connectable or disconnectable component that indicates whether the at least one connectable or disconnectable component is associated with the electronic device, wherein if the state of the indicator of the electronic device indicates that the electronic device is not locked for the only one user, the state of said second indicator is set to indicate that the connectable or disconnectable component is associated with the electronic device after preparing said second master value.

20. An electronic device to which at least one connectable or disconnectable component can be connected, the electronic device comprising:

a processor;

a non-transitory computer-readable medium communicatively coupled to the processor and storing instructions executable by the processor to perform operations comprising:

obtaining information specific to each of said at least one connectable or disconnectable component, the information being stored in each of said connectable or disconnectable component respectively;

preparing by a hashing function or a cryptographic function using as input said information specific to each of said at least one connectable or disconnectable component, and outputting as a result a temporary master value;

authenticating said temporary master value by using a second master value that has been previously prepared in order to determine the integrity of the electronic device, the second master value being a prior result of said hashing function or said cryptographic function;

obtaining information specific to a user of the electronic device as stored in said connectable or disconnectable component; and deducing the integrity of the electronic device from said authentication of said temporary master value and from authentication of the information specific to the user of the electronic device by using previously-obtained information specific to the user of the electronic device.

21. The electronic device according to claim 20, wherein the electronic device is a mobile electronic device.

* * * * *